July 17, 1928. 1,677,551

A. DELAS

PROCESS FOR PRODUCING IN A SOLUTION THE CRYSTALLIZATION
OF THE BODY DISSOLVED THEREIN

Filed July 25, 1925

Inventor
A. Delas
by Langner Parry, ... & Langner
Att'ys

Patented July 17, 1928.

1,677,551

UNITED STATES PATENT OFFICE.

ALBERT DELAS, OF PARIS, FRANCE, ASSIGNOR TO SOCIÉTÉ DES CONDENSEURS DELAS, A CORPORATION OF FRANCE.

PROCESS FOR PRODUCING IN A SOLUTION THE CRYSTALLIZATION OF THE BODY DISSOLVED THEREIN.

Application filed July 25, 1925, Serial No. 46,187, and in France August 6, 1924.

It is well known for the purpose of separating a dissolved body from its solvent to cool the entire mass for obtaining the crystallization of the dissolved body in the heart of the mass of liquid.

When the cooling is effected by bringing the product to be treated into contact with a cold wall, it frequently occurs that the crystallized body forms with the solvent a thick paste which is deposited on this wall, which reduces or completely prevents the thermic exchanges.

There thus results a retardation or even a complete stoppage of the operation.

The object of the present invention is to provide a device permitting of simultaneously cooling the entire mass of the body that is to say both solvent and dissolved body of which it is desired to effect the separation, by producing the necessary cold by evaporation of a volatile body, mixable or not with the product treated, and previously intimately incorporated with the mass.

The solution to be treated is introduced at the commencement of the operation into a closed and fluid-tight receptacle A at the same time as the volatile body of which the volatilization is to produce the necessary cold.

An agitator B, driven from the exterior by a shaft C which passes through a stuffing box D ensures the initial mixing, and in the case where the bodies are non-miscible maintains an emulsion during the whole duration of the operation.

Through an orifice O a compression member E, shown diagrammatically by a pump body, but which may be of any other type (compressor with piston, blades, rotary, ejector, pump or any other apparatus) draws the vapors from the volatile body, more or less mixed with those of the solvent, if this has a vapor tension appreciable under the conditions of the operation.

These vapors, if it is desired to recover them, are pressed into a surface condenser, shown diagrammatically by the coil S, cooled by any suitable agent.

The volatile body withdraws its heat of vaporization from the mixture of which it consequently produces the cooling, which promotes the crystallization desired.

The crystals are then separated from the mixture by any suitable decantation process.

Figure 1:
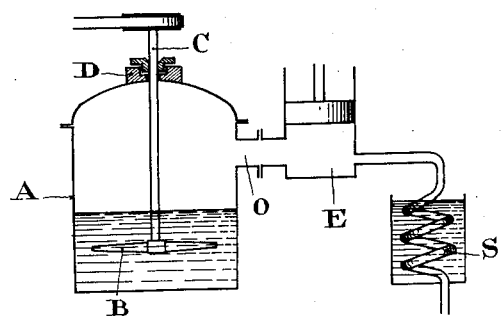
Fig. 1 illustrates one mode of construction of a device in accordance with the invention.
Figure 2:
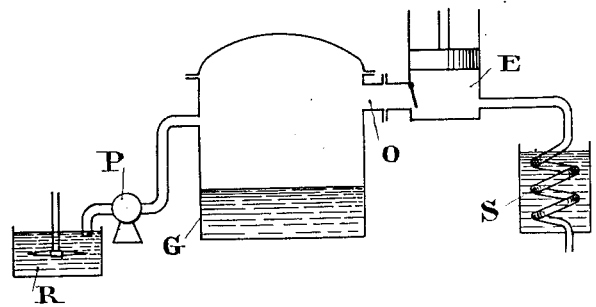
Figs. 2 and 3 are modifications.

Another method of construction shown in Fig. 2 consists in injecting into the space where the operation is carried out, for example by means of a pump P, the mixture of the solution to be treated and the volatile body previously placed into the outer tank R. In this way the evaporation generates a cooling in a continuous manner.

The mixture containing the crystals then falls to the lower part of the apparatus at G from where it is extracted by suitable means.

Figure 3:
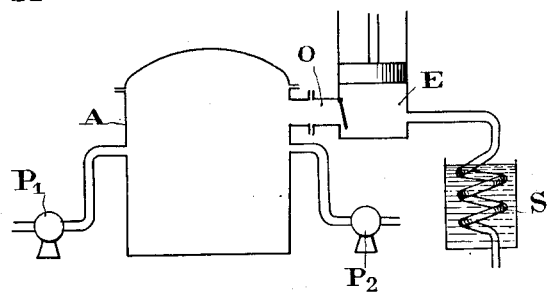

It is also possible as shown in Fig. 3 to inject separately, for example by means of pumps $P^1$ and $P^2$, the solution and the volatile body, in such a manner as to effect proportional mixing in the evaporating space.

Finally, in these two latter cases, it may be advantageous to atomize by a known device the mixture, or each liquid separately, at the moment of injection into the space, for the purpose of ensuring a more intimate mixture and for increasing the evaporation surfaces.

The process is applicable, in a general manner, to all substances, provided that the liquid to be evaporated, be more volatile than the solvent. By way of example can be cited mineral oils containing paraffines in solution, and organic oils containing fats of the same nature in solution, which are precipitated on emulsifying with water and then evaporating the water according to the invention.

The foregoing descriptions are not to be construed in a limiting sense as it is intended that the invention includes within its scope all methods and apparatus in which a foreign volatile body is added to the solution to give by its evaporation the cold necessary to obtain the desired crystallization.

What I claim is:—

1. The method of producing the crystallization of a substance in a solution in which it is dissolved, which comprises furnishing the necessary cold by vaporizing a volatile body intimately incorporated with the solution.

2. The method of producing the crystallization of a substance in a solution in which it is dissolved, which comprises intimately mixing a volatile body with said solution, and agitating the mixture to promote vaporization of the volatile body and to produce a spontaneous cooling effect.

3. The method of producing the crystallization of a substance in a solution in which it is dissolved, which comprises cooling the solution by means of a receptacle, introducing a volatile body into said solution, agitating the solution for producing an intimate mixing with said volatile body and sucking up the vapors of the volatile body from said receptacle.

4. The method of producing the crystallization of a substance in a solution in which it is dissolved, which comprises introducing a volatile body into said solution, agitating the solution for producing an intimate mixing with said volatile body, cooling the mixture by introducing it into a receptacle and sucking up the vapors of the volatile body from said receptacle.

5. The method of producing the cyrstallization of a substance in a solution in which it is dissolved, which comprises injecting the solution and a volatile body into a cooling receptacle in proportion with the needs of the operation and sucking up the vapors of the volatile body from said receptacle.

6. The method of producing crystallization of a substance in a solution in which it is dissolved, which comprises separately injecting the solution and a volatile body into a cooling receptacle to produce admixture therein in proportion with the needs of the operation and sucking up the vapors of the volatile body from said receptacle.

7. The method of producing cyrstallization of a substance in a solution in which it is dissolved, which comprises injecting the solution and a volatile body into a cooling receptacle separately or in admixture but in an atomized state for promoting the mixing and for increasing the surface of evaporation and sucking up the vapors of the volatile body from said receptacle.

8. The method of producing crystallization of a substance in a solution in which it is dissolved, which comprises cooling the solution by means of a receptacle, intimately mixing the solution with a volatile body, sucking up the vapors of the volatile body from said receptacle and recovering by condensation the vapors of the volatile body mixed in a more or less large proportion with those of the solvent.

In witness whereof, I have hereunto set my hand this 17th day of July 1925.

ALBERT DELAS.